US011658933B2

(12) United States Patent
Pillareddy et al.

(10) Patent No.: US 11,658,933 B2
(45) Date of Patent: May 23, 2023

(54) DYNAMICALLY LEARNING MEDIA ACCESS CONTROL AND INTERNET PROTOCOL ADDRESSES

(71) Applicant: Juniper Networks, Inc., Sunnyvale, CA (US)

(72) Inventors: Sangarshan Pillareddy, Bangalore (IN); Yuvaraja Mariappan, San Jose, CA (US); James Nicholas Davey, San Jose, CA (US); Prasad Miriyala, San Jose, CA (US); Richard Roberts, Rennes (FR); Margarida Correia, Suffolk (GB); Nagendra E S, Bangaluru (IN); Haji Mohamed Ashraf Ali, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 157 days.

(21) Appl. No.: 17/247,957

(22) Filed: Dec. 31, 2020

(65) Prior Publication Data

US 2022/0210113 A1 Jun. 30, 2022

(51) Int. Cl.
*H04L 12/46* (2006.01)
*H04L 61/103* (2022.01)
(Continued)

(52) U.S. Cl.
CPC .......... *H04L 61/103* (2013.01); *G06N 20/00* (2019.01); *H04L 12/4641* (2013.01);
(Continued)

(58) Field of Classification Search
CPC ......... G06F 9/45558; G06F 2009/4557; G06F 2009/45595; G06N 20/00; H04L 12/4641;
(Continued)

(56) References Cited

U.S. PATENT DOCUMENTS 9,356,866 B1 * 5/2016 Sivaramakrishnan ...................... H04L 45/586
9,571,394 B1 2/2017 Sivaramakrishnan et al.
(Continued)

FOREIGN PATENT DOCUMENTS

WO 2013184846 A1 12/2013

OTHER PUBLICATIONS

Juniper Networks, Inc, Contrail Networking, Contrail Networking Service Provider Focused Features Guide, downloadable at www.juniper.net, 136 pages, release 2011, Jan. 28, 2021.*
(Continued)

*Primary Examiner* — Frank Duong
(74) *Attorney, Agent, or Firm* — Shumaker & Sieffert, P.A.

(57) ABSTRACT

Techniques are described for learning an unknown virtual network information, such as an virtual Internet Protocol (IP) address, of a pod in a virtual network. In some examples, a virtual router executing at a computing device may receive an Address Resolution Protocol (ARP) packet from a virtual execution element in the virtual network, the virtual execution element executing at the computing device. The virtual router may determine, based at least in part on the ARP packet, whether virtual network information for the virtual execution element in a virtual network is known to the virtual router. The virtual router may, in response to determining that the virtual network information of the virtual execution element in the virtual network is not known to the virtual router, perform learning of the virtual network information for the virtual execution element.

18 Claims, 4 Drawing Sheets

(51) Int. Cl.
  *H04L 45/745* (2022.01)
  *G06N 20/00* (2019.01)
  *H04L 61/5007* (2022.01)
  *H04L 101/622* (2022.01)

(52) U.S. Cl.
  CPC ........ *H04L 45/745* (2013.01); *H04L 61/5007* (2022.05); *H04L 2101/622* (2022.05)

(58) Field of Classification Search
  CPC ............. H04L 41/0803; H04L 41/0895; H04L 45/745; H04L 61/00; H04L 61/10; H04L 61/103; H04L 61/5007; H04L 61/5038; H04L 67/02; H04L 67/1001; H04L 67/34; H04L 2101/622
  See application file for complete search history.

(56) References Cited

U.S. PATENT DOCUMENTS

| | | | | |
|---|---|---|---|---|
| 10,608,865 | B2* | 3/2020 | Nainar | H04L 61/103 |
| 10,855,531 | B2* | 12/2020 | Vaidya | G06F 9/45558 |
| 10,965,592 | B2* | 3/2021 | Suryanarayana | H04L 45/745 |
| 11,159,366 | B1* | 10/2021 | Gawade | H04L 41/0895 |
| 2008/0151893 | A1* | 6/2008 | Nordmark | H04L 45/00 370/392 |
| 2016/0087885 | A1* | 3/2016 | Tripathi | H04L 67/00 370/389 |
| 2018/0359215 | A1* | 12/2018 | Khare | H04L 49/70 |
| 2021/0073017 | A1* | 3/2021 | Lolage | H04L 12/4625 |
| 2021/0281536 | A1* | 9/2021 | Suzuki | H04L 61/103 |
| 2021/0314291 | A1* | 10/2021 | Chandrashekhar | H04L 45/42 |
| 2021/0385149 | A1* | 12/2021 | Suryanarayana | H04L 45/64 |
| 2022/0210158 | A1* | 6/2022 | Brar | G06F 9/45558 |

OTHER PUBLICATIONS

Juniper Networks, Inc, Contrail Networking Architecture Guide Detailed Technical Description of the Contrail Virtual Networking and Security Platform, downloadable at www.juniper.net, 53 pages, Nov. 2019.*

Mackie et al., "BGP-Signaled End-System IP/VPNs," draft-ietf-I3vpn-end-system-06, Network Working Group, Internet draft, Dec. 15, 2016, 32 pp.

"PCI-SIG SR-IOV Primer: An Introduction to SR-IOV Technology," Rev. 2.5, Intel Corp., Jan. 2011, 28 pp.

Rosen et al., "BGP/MPLS IP Virtual Private Networks (VPNs)," Network Working Group, RFC 4364, Feb. 2006, 48 pp.

* cited by examiner

DYNAMICALLY LEARNING MEDIA ACCESS CONTROL AND INTERNET PROTOCOL ADDRESSES

TECHNICAL FIELD

The disclosure relates to a virtualized computing infrastructure and, more specifically, to facilitating network connectivity for virtual execution elements (e.g., virtual machines or containers) deployed to virtualized computing infrastructure within a network.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are light-weight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

Containers can be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for learning and advertising network information for container pods in a virtualized computing infrastructure. When a pod is created in and executed by a virtual machine executing by a server of the virtualized computing infrastructure, the pod uses the virtual machine interface (VMI) for the virtual machine, and a container networking interface (CNI) plugin of the server may assign network information, such as an Internet Protocol (IP) address and/or a media access control (MAC) address, to the pod.

A virtual router creates virtual overlay networks ("virtual networks") on top of the physical underlay network and forwards data traffic between pods within a virtual overlay network and, in some cases, across between pods assigned to different virtual networks. When a first pod in a virtual network sends data packets to a second pod in the virtual network, the first pod may specify the network information of the second pod within the virtual network, such as the IP address and the MAC address of the second pod, as the destination for the data packets, and the virtual router may forward, based on the specified network information, the data packets to the second pod.

Virtualized computing infrastructures may be configured with a container layer operating over an infrastructure layer (such as one or more virtual machines). In some virtualized computing infrastructures, such as virtualized computing infrastructures that implement Calico CNI to configure networking interfaces for the container layer, the host servers perform double encapsulation, such as IP-in-IP encapsulation, of data packets, so that the data packets are encapsulated with information for routing the data packets to the receiver pod once received at the virtual machine one which the receiver pod executes. However, encapsulating data packets in this manner may increase the size of data packets transmitted between pods in the virtual network, increase processing latency due to the double encapsulation, and may increase amount of data traffic in the virtual network.

In some examples of the techniques of this disclosure, if a sender pod that attempts to send data packets to a receiver pod cannot determine the network information of the receiver pod, the sender pod may broadcast an address resolution protocol (ARP) request, which is received by the virtual router of the host server on which the sender pod is executing. For example, if the sender pod is able to determine the IP address but not the MAC address of the receiver pod, the sender pod may broadcast an ARP request that specifies the IP address of the receiver pod. The virtual router may therefore look up, using the IP address of the receiver pod, the MAC address of the receiver pod, and may send an ARP reply to the sender pod that specifies the IP address and the MAC address of the receiver pod. The sender pod may therefore use the IP address and the MAC address of the receiver pod to send data packets to the receiver pod.

In response to receiving an ARP request for the MAC address of a receiver pod, a conventional virtual router that is unable to lookup the MAC address that corresponds to the IP address may flood the virtual network interfaces in the virtual network with the ARP request. The virtual router may, in response to broadcasting the ARP request in this way, receive an ARP response that indicates the MAC address that corresponds to the IP address. However, performing such flooding of the network may also increase amount of data traffic in the virtual network. Although a network controller for the virtual network infrastructure provides network information for configuring virtual network interfaces for virtual machines on an infrastructure layer and advertises this network information, e.g., the MAC/IP address of each virtual machine, to the virtual routers that implement the virtual networks, the network controller may not have visibility into the network information for pods deployed to and executing on top of the virtual machines of the infrastructure layer. Such pods may be deployed by different tenants using their own orchestrator, for instance, and using the infrastructure layer as a service.

As pods are created in the virtualized computing infrastructure, network addresses such as IP addresses and MAC addresses are assigned to the newly-created pods. As noted above, therefore, the virtual router and the controller of the virtualized computing infrastructure may not necessarily be updated with network information regarding the newly-created pods, such as the IP/MAC address pair of the newly-created pods.

As such, in order to support communications between pods deployed to an infrastructure layer of virtual machines in the virtualized computing infrastructure, and in accordance with aspects of this disclosure, to perform learning of the network information of the pods in the virtualized computing infrastructure, the virtual router may snoop ARP traffic originating from pods, such as ARP requests and ARP replies. Because an ARP request or ARP reply may include the IP address and the MAC address of the pod that sent the ARP request or ARP reply, when the virtual router receives ARP traffic from the pods, the virtual router may determine, from the ARP traffic, the IP address and the MAC address of the pod that sent the ARP request or ARP reply, and may associate the IP address and the MAC address with the pod that sent the ARP request or ARP reply. The virtual router may also advertise the association of the pod with the IP address and the MAC address to the controller of the virtualized computing infrastructure. The controller may advertise these pairings to virtual routers on other servers in, e.g., Ethernet Virtual Private Network (EVPN) Type 2 routes or L3VPN routes, to reduce flooding across the underlay network of ARP requests.

The techniques may provide one or more technical advantages. For example, by learning the IP address and MAC address of pods in the virtualized computing infrastructure, the techniques described herein reduces a need to rely on previous methods of sending network traffic to pods having unknown IP addresses or unknown MAC addresses, including previous methods such as encapsulating network traffic or flooding the network traffic. The techniques described herein thereby improves the throughput of the virtualized computing infrastructure by potentially reducing the data size of the network traffic and/or the amount of network traffic that is transmitted throughout the virtualized computing infrastructure.

In one example, the disclosure is directed to a method. The method includes receiving, by a virtual router at a computing device in a virtualized computing infrastructure, an Address Resolution Protocol (ARP) packet from a virtual execution element in a virtual network, the virtual execution element executing at the computing device. The method further includes determining, by the computing device and based at least in part on the ARP packet, whether a virtual network address for the virtual execution element in the virtual network is known to the virtual router. The method further includes in response to determining that the virtual network address of the virtual execution element in the virtual network is not known to the virtual router, performing learning, by the virtual router at the computing device, of the virtual network address for the virtual execution element.

In another example, the disclosure is directed to a computing device in a virtualized computing infrastructure, comprising: processing circuitry coupled to a memory device; a virtual router configured for execution by the processing circuitry to: receiving an Address Resolution Protocol (ARP) packet from a virtual execution element in a virtual network, the virtual execution element executing at the computing device; and determine, based at least in part on the ARP packet, whether a virtual network address for the virtual execution element in the virtual network is known to the virtual router; and a virtual router agent configured for execution by the processing circuitry to: in response to determining that the virtual network address of the virtual execution element in the virtual network is not known to the virtual router, perform learning of the virtual network address for the virtual execution element.

In another example, the disclosure is directed to a computer-readable medium comprising instructions for causing a programmable processor of a computing device in a virtualized computing infrastructure to: receive, by a virtual router in a virtual network, the virtual execution element executing at the computing device, an Address Resolution Protocol (ARP) packet from a virtual execution element executing at the computing device; determine, based at least in part on the ARP packet, whether a virtual network address for the virtual execution element in the virtual network is known to the virtual router; and in response to determining that the virtual network address of the virtual execution element in the virtual network is not known to the virtual router, perform learning of the virtual network address for the virtual execution element.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
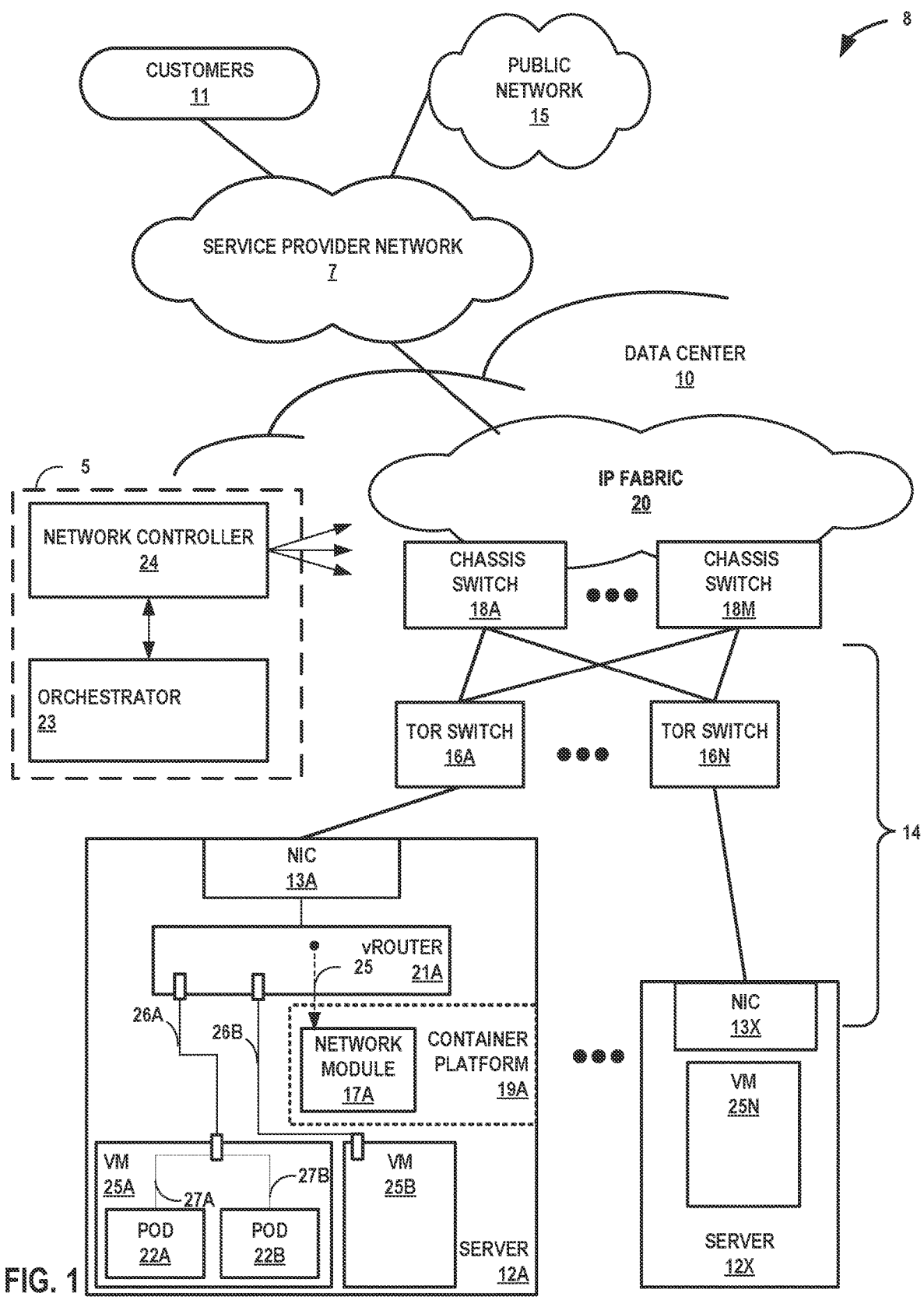
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a data center 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et, al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker-.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts, in virtual machine (VM) 25A, two virtual network endpoint in the form of pod 22A and pod 22B that each has one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O may be a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O. Further example details of SR-IOV implementations within a NIC are described in "PCI-SIG SR-IOV Primer: An Introduction to SR-IOV Technology," Rev. 2.5, Intel Corp., January, 2011, which is incorporated herein by reference in its entirety.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., VMs 25A and 25B), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure, such as part of providing container as a service (CaaS) and/or as infrastructure as a service (IaaS). VMs 25 may form an IaaS layer, and containers deployed within pods 22 may from a CaaS layer. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

Server 12A includes a container platform 19A for running containerized applications, such as those of pods 22A and pod 22B. Container platform 19A receives requests from orchestrator 23 to obtain and host, in server 12A, containers. Container platform 19A obtains and executes the containers.

Container platform 19A includes a network module 17A that configures virtual network interfaces for virtual network endpoints. The container platform 19A uses network module 17A to manage networking for VMs running on server 12A, such as VMs 25A and 25B. For example, the network module 17A creates virtual network interfaces to connect VMs 25A and 25B to virtual router 21A and enable VMs 25A and 25B to communicate, via the virtual network interfaces, to other virtual network endpoints over the virtual networks. Network module 17A may, for example, insert a virtual network interface for a virtual network into the network namespace for VM 25A and configure (or request to configure) the virtual network interface for the virtual network in virtual router 21A such that the virtual router 21A is configured to send packets received from the virtual network via the virtual network interface to VM 25A and to send packets received via the virtual network interface from VM 25A on the virtual network. Network module 17A may assign a network address, such as a virtual IP address for the virtual network and/or a media access control (MAC) address, and may setup routes for the virtual network interface.

Network module 171 may represent a library, a plugin, a module, a runtime, or other executable code for server 12A. Network module 17A may conform, at least in part, to a Container Networking Interface (CNI) specification or the rkt Networking Proposal. Network module 17A may represent a Contrail or OpenContrail network plugin. Network module 17A may alternatively be referred to as a network plugin or CNI plugin or CNI instance. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks.

Figure 3:
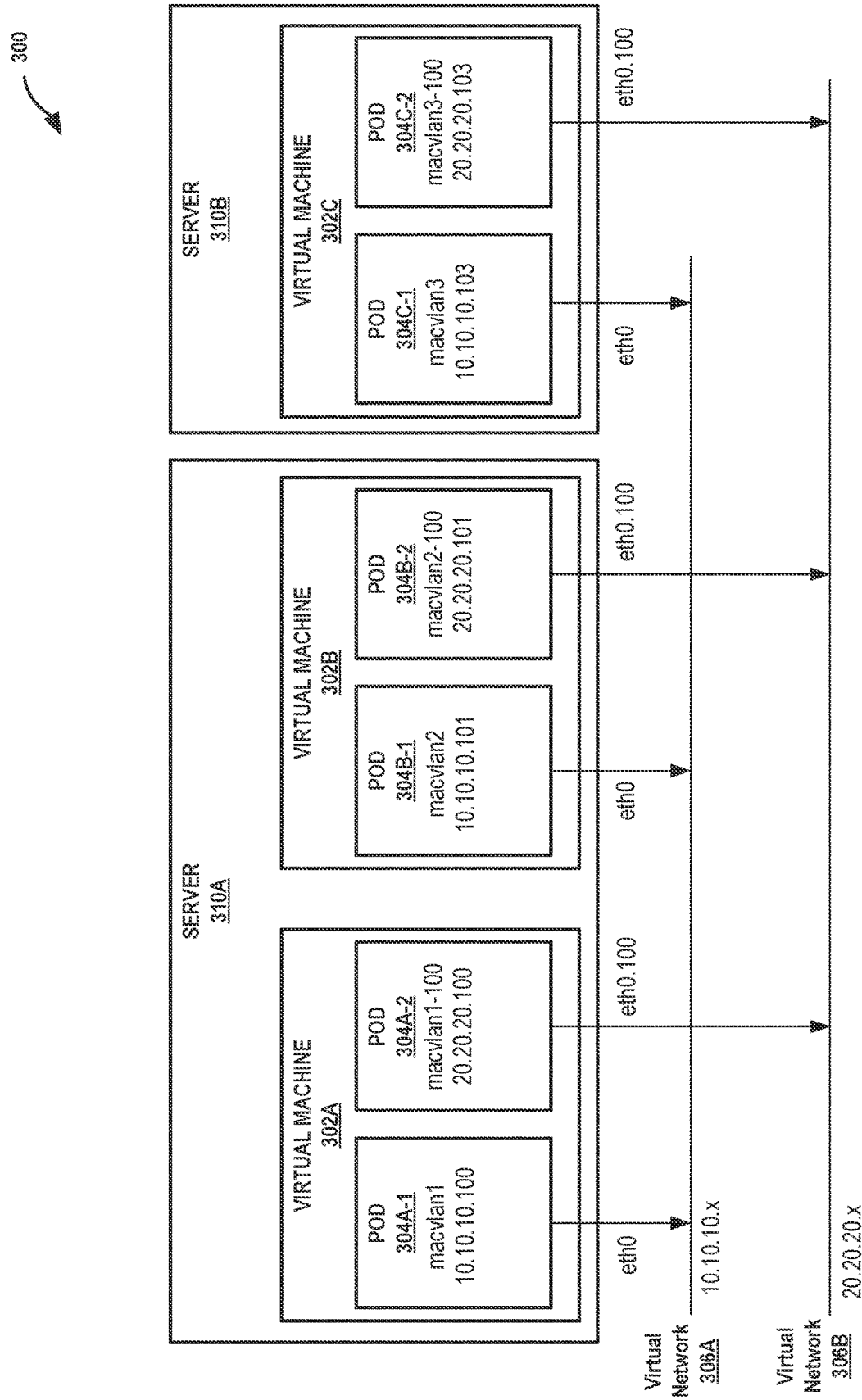
FIG. 3 is a block diagram illustrating an example topology of pods connected in virtual networks across servers, according to the techniques described in this disclosure.

In some examples, network module 17A may implement the macvlan CNI specification to be a macvlan CNI. In such examples, when a Pod (e.g., pod 22A) is attached to the network, network module 17A creates a sub-interface 27A from the parent interface 26A on the server 12A. A unique hardware MAC address is generated for each pod 22 created and attached to a virtual network in this way. In such examples, sub-interfaces 27A, 27B are macvlan interfaces, each with its own MAC address (different from interface 26A) and able to be assigned a virtual network address (e.g., virtual IP address) that is different from each other and from interface 26A. FIG. 3 illustrates an example of macvlan interfaces.

Network module 17A may configure one or more virtual network interfaces for each of VMs 25A and 25B, such as virtual network interface 26A for VM 25A and virtual network interface 26B for VM 25B, for corresponding virtual networks configured in switch fabric 14. Virtual network interfaces 26A and 26B may each represent a virtual ethernet ("veth") pair, where each end of the pair is a separate device (e.g., a Linux/Unix device), with one end of the pair assigned to VM 25A or VM 25B, respectively, and one end of the pair assigned to virtual router 21A. The veth pair or an end of a veth pair are sometimes referred to as "ports". Virtual network interface 26A and virtual network interface 26B may each alternatively represent a macvlan network with media access control (MAC) addresses assigned to the VM 25A or VM 25B, respectively, and to the vrouter 21A for communications between virtual router 21A and VMs 25A and 25B. Virtual network interfaces 26A and 26B may alternatively represent a different type of interface between virtual router 21A or other network virtualization entity and virtual network endpoints. Virtual network interfaces 26A and 26B may alternatively be referred to as virtual machine interfaces (VMIs), pod interfaces, container network interfaces, tap interfaces, veth interfaces, or simply network interfaces (in specific contexts), for instance.

virtual machines at server 12A, such as VMs 25A and 25B, may each contain one or more virtual execution elements, such as in the form of pods, that executes on the virtual machines. For example, VM 25A contains pods 22A and 22B, which are each a Kubernetes pod. A pod is a group of one or more logically-related containers (not shown in FIG. 1), the shared storage for the containers, and options on how to run the containers. Where instantiated for execution, a pod may alternatively be referred to as a "pod replica." In some examples, each container of pod 22A and pod 22B is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses (e.g., IP addresses and/or MAC addresses) from the new pod virtual network, and corresponding services for such pods draw network addresses from the new service virtual network When pods are created (by, e.g., orchestrator 23) in virtual machines having virtual network interfaces that represent a macvlan network, corresponding virtual network sub-interfaces for the pods are created from the virtual network interfaces of the virtual network interfaces to attach the pods to virtual networks. Thus, when the virtual network interfaces of the virtual machines are macvlan network interfaces, the pods residing in the virtual machines may have corresponding macvlan network sub-interfaces. Furthermore, the macvlan network sub-interfaces of the pods within a virtual machine may be assigned the same MAC address as the macvlan network interface of the virtual machine. In the example of FIG. 1, pods 22A and 22B may have or are associated with respective corresponding sub-interfaces 27A and 27B of virtual network interface 26A, and sub-interfaces 27A and 27B of pods 22A and 22B may each be assigned the same MAC address as the virtual network interface 26A of VM 25A. As such while the IP addresses of pods 22A and 22B may be different, pods 22A and 22B have the same MAC address as the MAC address of VM 25A.

As described above, the virtual network interfaces 26 of VMs 25 may each implement a macvlan CNI so that virtual network interfaces 26 may each represent a macvlan network interface. A macvlan network interface is a layer 2 virtual network interface that enable multiple virtual network interfaces (e.g., virtual network interfaces 26A and 26B) to be connected to a physical interface (e.g., NIC 13A of servers 12A). Each macvlan virtual network interface may be assigned a unique MAC address, and a virtual network interface may only see network traffic for a MAC address that matches the assigned MAC address of the virtual user interface. For instance, by implementing a macvlan CNI, virtual network interface 26A of VM 25A may be assigned a unique MAC address that is different from, e.g., the MAC address assigned to VM 25A. When virtual network interface 26A encounters network traffic for a MAC address that matches the assigned MAC address of virtual user interface 26A, virtual network interface 26A may be able to send the network traffic to the appropriate sub-interface (e.g., one of sub-interfaces 27A and 27B) having an assigned IP address that matches the IP address of the network traffic.

Pods of computing infrastructure 8, such as pods 22A and 22B, may communicate by sending data packets between pods 22A and 22B via, for example, virtual router 21A. When pods 22A and 22B are created, orchestrator 23 may assign, such as by using network module 17A, a virtual IP address to each of pods 22A and 22B in a virtual network that includes pods 22A and 22B. Thus, to send a packet from pod 22A to pod 22B, pod 22A may determine the virtual IP address and the MAC address assigned to pod 22B and send packets to the virtual IP address and the MAC address assigned pod 22B.

If pod 22A is unable to determine both the virtual IP address and the MAC address of pod 22B, such as by not having the MAC address of pod 22B stored in an address resolution protocol (ARP) cache, pod 22A may send an ARP request to virtual router 21A. For example, if pod 22A is able to determine the virtual IP address of pod 22B but is unable to determine the MAC address of pod 22B, pod 22A may send an ARP request for the MAC address of pod 22B to virtual router 21A that specifies the virtual IP address of pod 22B. Besides specifying the virtual IP address of pod 22B or the MAC address of pod 22B, the ARP request may also specify, in the header of the ARP request, the virtual IP address and the MAC address of pod 22A (i.e., the IP address assigned to the virtual network sub-interface 27A of virtual network interface 26A of VM 25A and the MAC address assigned to virtual network interface 26A) that sent the ARP request.

Virtual router 21A may store or otherwise access associations between virtual IP addresses and MAC addresses for pods in server 12A. That is, for a pod in server 12A, virtual router 21A may store an association or binding of the virtual IP address and the MAC address for the pod. For example, virtual router 21A may store or access one or more tables (e.g., one or more routing tables) or other data structure that stores associations between virtual IP addresses and interfaces (e.g., virtual network interfaces). Virtual router 21A may, in response to receiving the ARP request from pod 22A that specifies the virtual IP address of pod 22B, look up, in one or more tables of virtual router 21A, the virtual network interface 26B associated with the virtual IP address of pod 22B, which may be indicated by the MAC address that is associated with the virtual network interface 26B. In this way, virtual router 21A may be able to look up the MAC address that is associated with the virtual IP address of pod 22B, and may send an ARP reply to pod 22A that specifies the MAC address that is associated with the virtual IP address of pod 22B. Pod 22A may therefore use the virtual IP address of pod 22B and the MAC address of pod 22B, as specified in the ARP reply, to send data packets to pod 22B

In some examples, a pod, such pod 22A, may also broadcast gratuitous ARP (GARP) traffic to, for example, virtual router 21A, such as a GARP request. The GARP request sent from pod 22A may specify the IP address and the MAC address of the pod that sent the GARP request.

In accordance with aspects of this disclosure, when virtual router 21A receives an ARP packet, such as an ARP request, an ARP reply, or a GARP request from a pod, such as pod 22A, virtual router 21A may determine whether the virtual network information of pod 22A, such as the virtual IP address and/or the MAC address of pod 22A, is known to virtual router 21A, such as by determining whether the virtual IP address and the MAC address of pod 22A is stored in one or more tables in virtual router 21A. If virtual router 21A determines that the virtual IP address and/or the MAC address of pod 22A, is not known to virtual router 21A, virtual router 21A may snoop the ARP packet to learn the virtual IP address and/or the MAC address of pod 22A.

Because the ARP packet sent by pod 22A includes indications of the virtual IP address and the MAC address of pod 22A, such as in the header of the ARP packet, virtual router 21A may, in response to receiving the ARP packet from pod 22A, determine, from on the ARP packet, one or both of the virtual IP address and the MAC address of pod 22A that sent the ARP packet.

Virtual router 21A may determine whether the virtual IP address of pod 22A that sent the ARP packet and/or the MAC address of pod 22A are known to virtual router 21A by determining whether the virtual IP address of pod 22A that sent the ARP packet and the MAC address of pod 22A are stored in one or more tables stored in or accessed by virtual router 21. In some examples, if virtual router 21A stores or accesses a layer 2 forwarding table, virtual router 21A may determine whether the MAC address of pod 22A is already stored in the layer 2 forwarding table. Similarly, if virtual router 21A stores or accesses a layer 3 forwarding table, virtual router 21A may determine whether the virtual IP address of pod 22A is already stored in the layer 3 forwarding table.

If virtual router 21A determines that the virtual IP address of pod 22A that sent the ARP packet and the MAC address of pod 22A are stored in one or more tables stored in or accessed by virtual router 21, virtual router 21A determines that the virtual IP address of pod 22A that sent the ARP packet and the MAC address of pod 22A are known to virtual router 21A. If virtual router 21A determines that the virtual IP address of pod 22A that sent the ARP packet is not stored in one or more tables stored in or accessed by virtual router 21, virtual router 21A determines that the virtual IP address of pod 22A that sent the ARP packet is not known to virtual router 21A.

Virtual router 21A may, in response to determining that the virtual IP address of pod 22A that sent the ARP packet and/or the MAC address of pod 22A are not know to virtual router 21A, perform learning of the virtual IP address of pod 22A that sent the ARP packet and/or learning of the MAC address of pod 22A. To perform the learning, if virtual router 21A determines that the IP address of the sender of the ARP packet is not already stored in the layer 3 forwarding table, virtual router 21A may store an association of the IP address of the sender of the ARP packet and the MAC address of the virtual network interface of the sender of the ARP packet.

As part of performing learning of the virtual IP address of pod 22A and/or the MAC address of pod 22A, virtual router 21A may also advertise one or more routes associated with the virtual IP address of pod 22A and the MAC address of pod 22A to controller 5 for the computing infrastructure 8. Advertising routes to pod 22A may enable pods in the same virtual network as pod 22A but on other servers (e.g., on server 12X) to be able to communicate with pod 22A via the advertised routes. For example, virtual router 21A may generate one or more routes associated with the virtual IP address of pod 22A and the MAC address of pod 22A and may perform route advertisement to advertise one or more routes, such an EVPN type 2 route or an L3VPN route the virtual IP address of pod 22A and the MAC address of pod 22A to controller 5. Controller 5 may, in response to receiving the one or more routes associated with the virtual IP address of pod 22A and the MAC address of pod 22A, forward the routes to other servers in the network, such as to server 12X. Virtual router 21A may also create routes such as inet routes associated with the virtual IP address of pod 22A and the MAC address of pod 22A and bridge routes associated the virtual IP address of pod 22A and the MAC address of pod 22A that may be stored in virtual router 21A.

In some examples, virtual router 21A may also monitor pod liveliness of pods (e.g., pods 22A and 22B) in server 12A. For example, to monitor the liveliness of pod 22A, virtual router 21A may periodically send an ARP requests to pod 22A, such as every 3 seconds, every 30 seconds, every minute, and the like. Pod 22A may, in response to receiving an ARP request from virtual router 21A, may send an ARP reply back to virtual router 21A. If virtual router 21A does not receive an ARP reply from pod 22A in response to a specified number of consecutive ARP requests sent to pod 22A, such as 3 consecutive ARP requests, virtual router 21A may determine that pod 22A is unreachable and may trigger route deletion for routes to pod 22A.

In some examples, virtual router 21A may use the Bidirectional Forwarding and Detection (BFD) protocol to perform health checks on pods (e.g., pods 22A and 22B) in server 12A. For example, virtual router 21A may establish a BFD session with pod 22A and may periodically poll pod 22A, such as by periodically sending packets to pod 22A. If virtual router 21A does not receive a response from pod 22A in response to a specified number of consecutive packets sent to pod 22A, such as 3 consecutive packets sent to pod 22A, virtual router 21A may determine that pod 22A is unreachable and may trigger route deletion for routes to pod 22A.

In some examples, virtual router 21A may be able to detect movements of pods within server 12A as well as movement of pods across data center 10, such as from server 12A to another server in data center 10, such as to server 12X. Movement of pods may refer to the deletion of a pod having an IP address and a MAC address and the creation of a new pod having the same IP address of the deleted pod.

Virtual router 21A may determine that a pod has moved within server 12A based on snooping ARP requests, such as pod 22A moving from virtual machine 25A to virtual machine 25B. As described above, when virtual router 21A receives a ARP request from a pod, virtual router 21A may snoop the ARP packet to learn the virtual IP address and the MAC address of the pod that sent the ARP packet. If virtual router 21A determines that the virtual IP address of the sender of the ARP packet is already stored in the layer 3 forwarding table and matches the virtual IP address of pod 22A, virtual router 21A may determine whether the MAC address of the sender of the ARP packet matches the MAC address of pod 22A. If virtual router 21A determines that the MAC address of the sender of the ARP packet does not match the MAC address of pod 22A, virtual router 21A may determine that pod 22A has moved within server 12A, such as being deleted from virtual machine 25A and being created with the same virtual IP address and with a different MAC address on another virtual machine in server 12A, such as virtual machine 25B.

Virtual router 21A may, in response to determining that a pod has moved within server 12A, virtual router 21A may retract previously-advertised routes associated with the virtual IP address and the MAC address of the pod, such as previously-advertised EVPN type 2 routes associated with the virtual IP address and the MAC address of the pod and previously-advertised EVPN type 2 routes associated with the MAC address of the pod. Virtual router 21A may also perform route advertisement to advertise a new EVPN type 2 route to the virtual IP address and the new MAC address of the pod, and may advertise an updated L3VPN route for the virtual IP address of the pod.

In some examples, virtual router 21A may determine that a pod has moved from server 12A to another server based on route advertisements received from controller 5, such as moving from virtual machine 25A on server 12A to virtual machine 25N on server 12X. For example, when virtual router 21A receives a route advertisement from controller 5, such as an EVPN type 2 route advertisement associated with a virtual IP address and a MAC address, virtual router 21A may determine whether one or more tables stored in or accessed by virtual router 21A stores the virtual IP address associated with the route advertisement If virtual router 21A determines that the one or more tables stores the virtual IP address associated with the route advertisement and is the same virtual IP address as the virtual IP address for pod 22A, virtual router 21A may determine whether the MAC associated with the route advertisement matches the MAC address of pod 22A. If virtual router 21A determines that the MAC address associated with the route advertisement does not match the MAC address of pod 22A, virtual router 21A may determine that pod 22A has moved to another server, such as being deleted from virtual machine 25A and being created with the same virtual IP address and with a different MAC address on another server, such as in virtual machine 25N on server 12N If virtual router 21A may determine that the pod having the virtual IP address specified by the route advertisement has moved from server 12A to another server, virtual router 21A may retract route advertisements that advertise the pod as being associated with the associated virtual IP address and MAC address stored in the one or more tables. For example, virtual router 21A may retract an EVPN type 2 MAC/IP route associated with the virtual IP address and MAC address of the pod, the EVPN type 2 IP route associated with the MAC address of the pod, and the L3VPN route associated with the virtual IP address of the pod, such as by sending route deletion events for the advertised routes.

Figure 2:
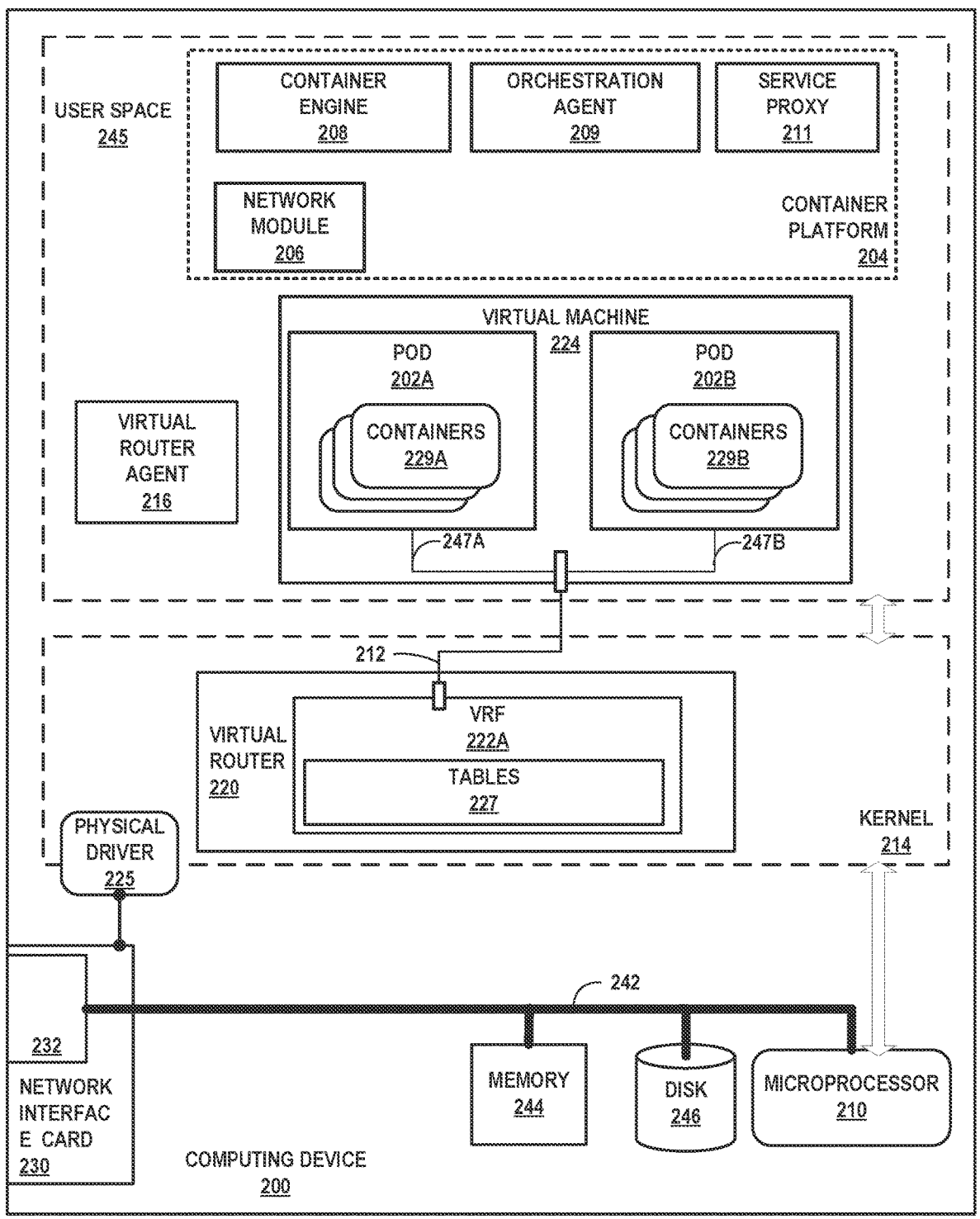
FIG. 2 is a block diagram of an example computing device (e.g., host) that includes a virtual router configured to learn the network addresses of one or more virtual execution elements (e.g., pods), according to techniques described in this disclosure.

FIG. 2 is a block diagram of an example computing device (e.g., host) that includes a virtual router configured to learn the network addresses of one or more virtual execution elements (e.g., pods), according to techniques described in this disclosure. Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). NIC 230 may be SR-IOV-capable. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based virtual machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as containers 229A-229B or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 220 executes within kernel 214, but virtual router 220 may execute within a hypervisor, a host operating system, a host application, or a virtual machine in various implementations.

Virtual router 220 is a forwarding plane that may replace and subsume the virtual routing/bridging functionality of the Linux bridge/OVS module that is commonly used for Kubernetes deployments of pods 202. Virtual router 220 may perform bridging (e.g., EVPN) and routing (e.g., L3VPN, IP-VPNs) for virtual networks. Virtual router 220 may perform networking services such as applying security policies, NAT, multicast, mirroring, and load balancing. Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 220 may represent a PE router and virtual execution endpoints may be examples of CE devices described in RFC 4364.

Computing device 200 includes a virtual router agent 216 that controls the overlay of virtual networks for computing device 200 and that coordinates the routing of data packets within computing device 200. In general, virtual router agent 216 communicates with network controller 24 for the virtualization infrastructure, which generates commands to control create virtual networks and configure network virtualization endpoints, such as computing device 200 and, more specifically, virtual router 220, as a well as virtual network interfaces 212, 213. By configuring virtual router 220 based on information received from network controller 24, virtual router agent 216 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 229A-229B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any containers of pods 202, and virtual router 220 exchanges packets with pods 202 via bus 242 and/or a bridge of NIC 230.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 220 implements one or more virtual routing and forwarding instances (VRFs) 222A-222B for respective virtual networks for which virtual router 220 operates as respective tunnel endpoints. In general, each VRF 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212A. VRF 222A forwards the inner packet via virtual network interface 212A to pod 202A in response.

Containers 229A-229B may also source inner packets as source virtual network endpoints. Container 229A, for instance, may generate a layer 3 inner packet destined for a destination virtual network endpoint that is executed by another computing device (i.e., not computing device 200) or for another one of containers 229A-229B. Container 229A sends the layer 3 inner packet to virtual router 220 via virtual network interface 212A attached to VRF 222A.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate one of virtual network interfaces 212, 213.

In some examples, a controller for computing device 200 (e.g., network controller 24 of FIG. 1) configures a default route in each of pods 202 to cause the virtual machines 224 to use virtual router 220 as an initial next hop for outbound packets. In some examples, MIC 230 is configured with one or more forwarding rules to cause all packets received from virtual machines 224 to be switched to virtual router 220.

Virtual machine 224 may represent an example instance of virtual machine 25A of FIG. 1. Pods 202A-202B may represent example instances of pods 22A and 22B of FIG. 1, in further detail. Pod 202A includes one or more containers 229A, and pod 202B includes one or more containers 229B.

Container platform 204 may represent an example instance of container platform 19A of FIG. 1, in further detail. Container platform 204 include container runtime 208, orchestration agent 209, service proxy 211, and network module 206. Network module 206 may represent an example instance of network module 17A of FIG. 1, there being invoked one network module 206 per pod 202.

Container engine 208 includes code executable by microprocessor 210. Container runtime 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from controller agent 209, container engine 208 may obtain images and instantiate them as executable containers 229A-229B in pods 202A-202B.

In general, each of pods 202A-202B may be assigned one or more virtual network addresses for use within respective virtual networks, where each of the virtual networks may be associated with a different virtual subnet provided by virtual router 220. Pod 202B may be assigned its own virtual layer three (L3) address, for example, for sending and receiving communications but may be unaware of an IP address of the computing device 200 on which the pod 202B is located. The virtual network address may thus differ from the logical address for the underlying, physical computer system, e.g., computing device 200.

Service proxy 211 includes code executable by microprocessor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220 and pods 202 by network modules 206.

Orchestration agent 209 includes code executable by microprocessor 210. Orchestration agent 209 may be one or more computer processes. Orchestration agent 209 may represent a kubelet for a minion node of a Kubernetes cluster. Orchestration agent 209 is an agent of an orchestrator, e.g., orchestrator 23 of FIG. 1, that receives container specification data for containers and ensures the containers execute by computing device 200. Based on the container specification data, orchestration agent 209 directs container engine 208 to obtain and instantiate the container images for containers 229, for execution of containers 229 by computing device 200.

Orchestration agent 209 instantiates a single one of network modules 206 to configure one or more virtual network interfaces for each of pods 202. Each of network modules 206 may represent an example instance of network module 17A of FIG. 1. For example, orchestration agent 209 receives a container specification data for pod 202A and directs container engine 208 to create the pod 202A with containers 229A based on the container specification data for pod 202A. Orchestration agent 209 also invokes the network module 206 to configure, for pod 202A, virtual network sub-interface 247A to network interface 212A for a virtual network corresponding to VRF 222. In a similar manner, orchestration agent 209 directs container engine 208 to create the pod 202B with containers 229B based on the container specification data for pod 202B. Orchestration agent 209 also invokes network module 206 to configure, for pod 202B, virtual network sub-interface 247B to virtual network interface 212B for a virtual network corresponding to VRF 222. In this example, both pod 202A and pod 202B are virtual network endpoints for the virtual network corresponding to VRF 222, virtual network sub-interfaces 247A and 247B may represent example instances of virtual network sub-interfaces 27A and 27B described in FIG. 1, and network interfaces 212 may represent an example instance of one of virtual network interfaces 26 described in FIG. 1.

Network module 206 may obtain interface configuration data for configuring virtual network interfaces for pods 202. Virtual router agent 216 operates as a virtual network control plane module for enabling network controller 24 to configure virtual router 220. Unlike the orchestration control plane (including the container platforms 204 for minion nodes and the master node(s), e.g., orchestrator 23), which manages the provisioning, scheduling, and managing virtual execution elements, a virtual network control plane (including network controller 24 and virtual router agent 216 for minion nodes) manages the configuration of virtual networks implemented in the data plane in part by virtual routers 220 of the minion nodes. Virtual router agent 216 communicates, to network modules 206, interface configuration data for virtual network interfaces to enable an orchestration control plane element (i.e., network module 206) to configure the virtual network interfaces according to the configuration state determined by the network controller 24, thus bridging the gap between the orchestration control plane and virtual network control plane.

When pod 202A communicates with pod 202B by sending data packets to pod 202B, pod 202A may specify the virtual network information (e.g., IP address and MAC address) of pod 202B within the virtual network, as the destination network information for the data packets, and may send such data packets to virtual router 220. VRF 222 of virtual router 220 may include tables 227 that virtual router 220 may use to route and forward packets within a virtual network corresponding to VRF 222, which may be the virtual network for which pod 202A and pod 202B are virtual network endpoints. For example, tables 227 may include one or more forwarding tables (e.g., a forwarding information base), one or more routing tables (e.g., a routing information base), one or more flow tables, and the like that may be used for routing packets within the virtual network corresponding to VRF 222. Virtual router 220 may determine how to route the data packets sent by pod 202A to the specified destination address based on the information (e.g., route information) stored in tables 227 and may therefore forward the data packets based on the specified destination network information to pod 202B.

In some examples, the virtual network information of pods 202A and 202B in the virtual network corresponding to VRF 222 may include a MAC address, a virtual IP address, or both a MAC address and a virtual IP address. In some examples, pods within the same virtual machine (e.g., pods 202A and 202B in virtual machine 224) may share the same MAC address, which may be the MAC address assigned to virtual network interface 212, but may each have different virtual IP addresses.

In examples where the virtual network information of pods 202A and 202B include both a virtual IP address and a MAC address, if pod 202A does not have knowledge of both the virtual IP address and the MAC address of pod 202B, pod 202A may send an ARP request to virtual router 220 to request the virtual IP address and/or the MAC address of pod 202B. For example, if pod 202A has knowledge of the virtual IP address of pod 202B but does not have knowledge of the MAC address of pod 202B, pod 202A may send an ARP request that specifies the virtual IP address of pod 202B to virtual router 220. Virtual router 220 may, in response, send an ARP response to pod 202B that specifies the MAC address of pod 202B. In some examples, pod 202A may also, on occasions, send a gratuitous ARP (GARP) request or a FARP response to virtual router 220. In general, throughout this disclosure, the term "ARP packet" or "ARP traffic" may include an ARP request, an ARP response, or a GARP request.

As described above, as orchestration agent 209 directs container engine 208 to create pods (e.g., pods 202A and 22B) executing on computing device 200, network module 206 may configuring virtual network interfaces for such created pods, such as assigning a virtual IP address) for each created pod, and each of the pods may have the same MAC address as the virtual machine in which the pod resides. However, the IP addresses of the newly created pods may not be announced or otherwise sent by orchestration agent 209 or container engine 208 to virtual router 220. As such, virtual router 220 may be unable to advertise routes to the newly created pods to pods on other servers in the virtualized computing infrastructure.

In accordance with aspects of the present disclosure, virtual router 220 may perform learning of the virtual network information (e.g., the IP address and/or the MAC address) of newly created pods in computing device 200 by snooping ARP packets, such as ARP requests, ARP responses, or GARP requests, from pods (e.g., pods 202A and 22B) executing on computing device 200. Because an ARP packet sent from a pod specifies the virtual network information for the pod that sent the ARP packet, virtual router 220 may be able to determine the virtual network information of a pod that sends an ARP packet based on the information contained in the ARP packet.

In some examples, pod 202A may send an ARP request to virtual router 220, where the ARP request may be, for example, a request for the virtual network information for pod 202B. Because an ARP request specifies the virtual network information of the sender of the ARP request, the ARP request sent by pod 202A may contain the virtual network information of pod 202A.

Virtual router 220 may receive the ARP request from pod 202A and may, in response to receiving the ARP request, determine, based at least in part on the ARP packet, whether the virtual network information for pod 202A, such as the IP address for pod 202A, is known to virtual router 220. Because the ARP request from pod 202A contains the virtual network information such as the IP address and the MAC address of pod 202A, virtual router 220 may determine whether the virtual network information for pod 202A is known to virtual router 220 by determining whether the virtual network information for pod 202A, as specified in the ARP packet, is stored in tables 227, such as by determining whether the virtual network information for pod 202A is stored in a forwarding table, a routing table, and the like in tables 227.

In some examples, if the virtual network information for pod 202A contains a MAC address, virtual router 220 may determine whether the MAC address of pod 202A is stored in a layer 2 table in table 227. In some examples, if the virtual network address for pod 202A contains a virtual address, virtual router 220 may determine whether the virtual IP address of pod 202A is stored in a layer 3 table in table 227. In some examples, if the virtual network information for pod 202A contains a virtual IP address and a MAC address, virtual router 220 may determine whether the virtual IP address of pod 202A is stored in a layer 3 table in table 227 and whether the MAC address of pod 202A is stored in a layer 2 table in table 227.

In some examples, if the virtual network information for pod 202A contains a virtual IP address and a MAC address, virtual router 220 may determine whether table 227 stores an association of the virtual IP address of pod 202A with the MAC address of pod 202A. If virtual router 220 determines that table 227 stores an association of the virtual IP address of pod 202A with the MAC address of pod 202A, virtual router 220 may determine that the virtual network information for pod 202A is known to virtual router 220.

If virtual router 220 determines that the virtual network information for pod 202A is stored in tables 227, such as if virtual router 220 determines that table 227 stores an association of the virtual IP address of pod 202A with the MAC address of pod 202A, virtual router 220 may determine that the virtual network information for pod 202A is known to virtual router 220. On the other hand, if virtual router 220 determines that the virtual network information for pod 202A is not stored in tables 227, virtual router 220 may determine that the virtual network information for pod 202A is not known to virtual router 220.

Virtual router 220 may, in response to determining that the virtual network information of pod 202A is not known to the virtual router 220, perform learning of the virtual network information of pod 202A. Performing learning of the virtual network information of pod 202A may include storing the virtual network information of pod 202A in tables 227 and/or creating one or more route advertisements associated with the virtual network information of pod 202A for sending to, e.g., the controller of the virtual computing infrastructure so that pod 202A can be reached from other computing devices of the virtual computing infrastructure.

Virtual router 220 may use virtual router agent 216 that executes in user space 245 of computing device 200 to perform learning of the virtual network information of pod 202A. To use virtual router agent 216 to perform learning of the virtual network address of pod 202A, virtual router 220 may spoof an ARP packet and may send the ARP packet to virtual router agent 216. That is, virtual router 220 may create an ARP packet that includes or otherwise specifies the virtual network information of pod 202A and may send the ARP packet to virtual router agent 216.

Virtual router agent 216 may receive, from virtual router 220, the ARP packet specifying the virtual information of pod 202A and may, in response, advertise one or more routes associated with the virtual network information for pod 202A to other pods on the same virtual network as pod 202A, such as by advertising the one or more routes to a network controller for the virtualized computing infrastructure, such as to network controller 24 of FIG. 1. The network controller may, in response to receiving the one or more route advertisements, direct other servers on which pods of the virtual network execute to add the one or more routes in the virtual routers. As such, the one or more routes associated with the virtual network information for pod 202A may be routes that can be used by other computing devices and servers in the virtual computing infrastructure to route data traffic from virtual execution elements in the virtual network to other servers to virtual network sub-interface 247A of pod 202A at computing device 200.

For example, virtual router agent 216 may generate EVPN and L3VPN routes associated with the virtual network information for pod 202A, such as an EVPN Type 2 route associated with the virtual IP address and the MAC address associated with pod 202A, an EVPN Type 2 route associated with the MAC address associated with pod 202A, inet routes associated with the virtual network information, bridge routes associated with the virtual network address, and the like, and may advertise the generated routes, such as by sending the generated routes to the network controller and to virtual router 220.

Virtual router agent 216 may also, in response to receiving the ARP packet specifying the virtual network information of pod 202A, store the virtual network information and/or one or more routes associated with the virtual network information for pod 202A in tables 227, such as in one or more of the forwarding tables and/or routing tables in tables 227. In some examples, if the virtual network information for pod 202A is a MAC address, virtual router agent 216 may store the MAC address of pod 202A in a layer 2 table in table 227. In some examples, if the virtual network information for pod 202A is a virtual IP address, virtual router agent 216 may store the virtual IP address of pod 202A in a layer 3 table in table 227. In some examples, if the virtual network information for pod 202A is a virtual IP address and a MAC address, virtual router agent 226 may store the virtual IP address of pod 202A in a layer 3 table in table 227 and may store the MAC address of pod 202A in a layer 2 table in table 227. In some examples, if the virtual network information for pod 202A is a virtual IP address and a MAC address, virtual router agent 226 may store an association of the virtual IP address for pod 202A and the MAC address for pod 202A in tables 227.

In some examples, in response to virtual router 220 learning the virtual network information for pod 202A, virtual router agent 216 may monitor the liveliness of pod 202A by periodically sending ARP requests to pod 202A, such as every 30 seconds, every minute, every 3 minutes, every 5 minutes, and the like. That is, virtual router agent 216 may periodically send ARP requests to the virtual network information for pod 202A, such as periodically sending ARP requests to the virtual IP address and the MAC address for pod 202A. Pod 202A may, in response to receiving an ARP request from virtual router agent 216, send an ARP response to virtual router agent 216. If virtual router agent 216 does not receive ARP replies to a specified number of consecutive ARP responses sent to pod 202A, such as 3 consecutive ARP responses, virtual router agent 216 may determine that pod 202A is unreachable.

In some examples, in response to virtual router 220 learning the virtual network information for pod 202A, virtual router agent 216 may monitor the health of pod 202A by establishing a bidirectional forwarding and detection (BFD) session with the virtual network information for pod 202A. Virtual router agent 216 may determine whether pod 202A is unreachable based on the BFD session. As long as virtual router agent 216 determines that the BFD session with the virtual network information for pod 202A is up, virtual router agent 216 may determine that pod 202A is reachable. However, if virtual router agent 216 determines that the BFD session with the virtual network information for pod 202A is down, virtual router agent 216 may determine that pod 202A is unreachable.

Virtual router agent 216 may, in response to determining that pod 202A is unreachable, delete routes to pod 202A, such as routes associated with the virtual network address of pod 202A. For example, virtual router agent 216 may delete routes to pod 202A as stored in tables 227 of virtual router 220. Virtual router agent 216 may also send a route deletion request to the controller of the virtual network infrastructure to delete routes such as EVPN and L3VPN routes associated with the virtual network address for pod 202A.

In some examples, virtual router 220 may determine movement of pods within computing device 200. Movement of pods within computing device 200 may include deleting a first pod having a virtual IP address and a MAC address from a first virtual machine, such as virtual machine 225 in computing device 200 and creating, in a second virtual machine in computing device 200, a second pod having the same virtual IP address as the first pod and a different MAC address than the MAC address for the first pod.

To determine movement of pods within computing device 200, virtual router 220 may receive an ARP request from a pod executing at a virtual machine in computing device 200 and may, in response to receiving the ARP request, determine, based on the ARP request, the virtual IP address for the pod and the MAC address for the pod. Virtual router 220 may therefore determine if the virtual IP address for the pod is already stored in the tables 227. If virtual router 220 determines that the virtual IP address for the pod that sent the ARP request is already stored in the tables 227, virtual router 220 may determine whether the MAC address for the pod that sent the ARP request matches the MAC address associated with the virtual IP address for the pod that sent the ARP request as stored in tables 227.

For example, if virtual router 220 determines that the virtual IP address for the pod that sent the ARP request matches the virtual IP address for pod 202A as stored in tables 227, virtual router 220 may determine whether the MAC address for the pod that sent the ARP request matches the MAC address for pod 202A associated with the virtual IP address for pod 202A by determining whether the MAC address for the pod that sent the ARP request matches the MAC address for pod 202A as stored in tables 227. If virtual router 220 determines that the MAC address for the pod that sent the ARP request does not match the MAC address for pod 202A as stored in tables 227, virtual router 220 determines that pod 202A has been deleted. Virtual router agent 216 may, in response to determining that pod 202A has been deleted, delete routes to pod 202A, as described above.

In some examples, virtual router 220 may determine movement of pods across computing devices in the virtual computing infrastructure. Movement of pods across computing devices may include deleting a first pod having a virtual IP address and a MAC address from a virtual machine, such as virtual machine 225 in computing device 200 and creating, in another computing device in the virtual computing infrastructure, a second pod having the same virtual IP address as the first pod and a different MAC address than the MAC address for the first pod.

To determine movement of pods across computing networks, virtual router 220 may receive, from a network controller for the virtualized computer infrastructure, such as network controller 24 of FIG. 1, a request to add a route associated with a virtual network information, such as a route associated with a virtual IP address and a MAC address. If virtual router 220 determines that the virtual IP address associated with the route is stored in table 227, virtual router 220 may determine that a pod in computing device 200 having the same virtual network information as the virtual network information associated with the route has been deleted.

For example, virtual router 220 may receive, from a network controller for the virtualized computer infrastructure, such as network controller 24 of FIG. 1, a request to add a route associated with virtual network information. The request to add a route may, for example, be an EVPN type 2 route associated with the virtual network information, which may be a virtual IP address and a MAC address. Virtual router 220 may, in response to receiving the request to add a route associated with a virtual IP address and a MAC address, determine if the virtual IP address associated with the route is already stored in the tables 227. If virtual router 220 determines that the virtual IP address associated with the route is already stored in the tables 227, virtual router 220 may determine whether the MAC address associated with the route matches the MAC address associated with the virtual IP address associated with the route as stored in tables 227.

For example, if virtual router 220 determines that the virtual IP address associated with the route matches the virtual IP address for pod 202A as stored in tables 227, virtual router 220 may determine whether the MAC address associated with the route matches the MAC address for pod 202A associated with the virtual IP address for pod 202A by determining whether the MAC address associated with the route matches the MAC address for pod 202A as stored in tables 227. If virtual router 220 determines that the MAC address associated with the route does not match the MAC address for pod 202A as stored in tables 227, virtual router 220 determines that pod 202A has been deleted from computing device 200. Virtual router agent 216 may, in response to determining that pod 202A has been deleted, delete routes to pod 202A, as described above.

FIG. 3 is a block diagram illustrating an example topology of pods connected in virtual networks across servers, according to the techniques described in this disclosure. As shown in FIG. 3, computing infrastructure 300, which is an example of computing infrastructure 8 described in FIG. 1, includes servers 310A and 310B, which are examples of servers 12A-12X described in FIG. 1. Servers 310A and 310B may execute virtual machines 302A-302C, which may be examples of virtual machines 25 described in FIG. 1. For example, Virtual machines 302A and 302B may execute at server 310A while virtual machine 302C may execute at server 310B.

Virtual machine 302A may contain pods 304A-1 and 304A-2, such as Kubernetes pods, which may be examples of pods 22A and 22B described in FIG. 1. Similarly, virtual machine 302B may contain pods 304B-1 and 304B-2 and virtual machine 302C may contain pods 304C-1 and 304C-2. Pods 304A-1, 304B-1, and 304C-1 may be part of virtual network 306A, which may be a Contrail virtual network. All pods in virtual network 306A may have a virtual IP address with the same first three octets, in the form of 10.10.10.X. For example, pod 304A-1 may have a virtual IP address of 10.10.10.100, pod 304B-1 may have a virtual IP address of 10.10.10.101, and pod 304C-1 may have a virtual IP address of 10.10.10.10C. Although pods 304A-1 and 304B-1 are on different virtual machines and pod 304C-1 is on a different server than pods 304A-1 and 304B-1, pods 304A-1, 304B-1, and 304C-1 may all be on the same virtual network 306A. As such, a virtual network may include pods on different virtual machines and on different servers.

Similarly, pods 304A-2, 304B-2, and 304C-2 may be part of virtual network 306B, which may be a Contrail virtual network. All pods in virtual network 306B may have a virtual IP address with the same first three octets, in the form of 20.20.20.X. For example, pod 304A-2 may have a virtual IP address of 20.20.20.100, pod 304B-2 may have a virtual IP address of 20.20.20.101, and pod 304C-2 may have a virtual IP address of 20.20.20.10C. As can be see, each of virtual machines 302A-302C may be able to contain pods on different networks. For example, virtual machine 302A includes both pod 304A-1 on virtual network 306A and pod 304A-2 on virtual network 306B, virtual machine 302B includes both pod 304B-1 on virtual network 306A and pod 304B-2 on virtual network 306B, and, virtual machine 302C includes both pod 304C-1 on virtual network 306A and pod 304C-2 on virtual network 306B.

Virtual network interfaces of virtual machines 302A-302C and virtual network sub-interfaces of pods 304A-304C may each implement a macvlan interface to connect to and communicate with each other via virtual networks 306A and 306B. Thus, for example, virtual machines 302A-302C may each implement two macvlan interfaces at eth0 and eth0-100. By implementing macvlan interfaces, each of pods 304A-304C may be assigned a virtual IP address and a MAC address and may communicate with each other using the virtual IP addresses and the MAC addresses. For example, pod 304A-1 may communicate with pod 304C-1 across virtual network 306A using the virtual IP address and the MAC address of virtual network 306A.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 4:
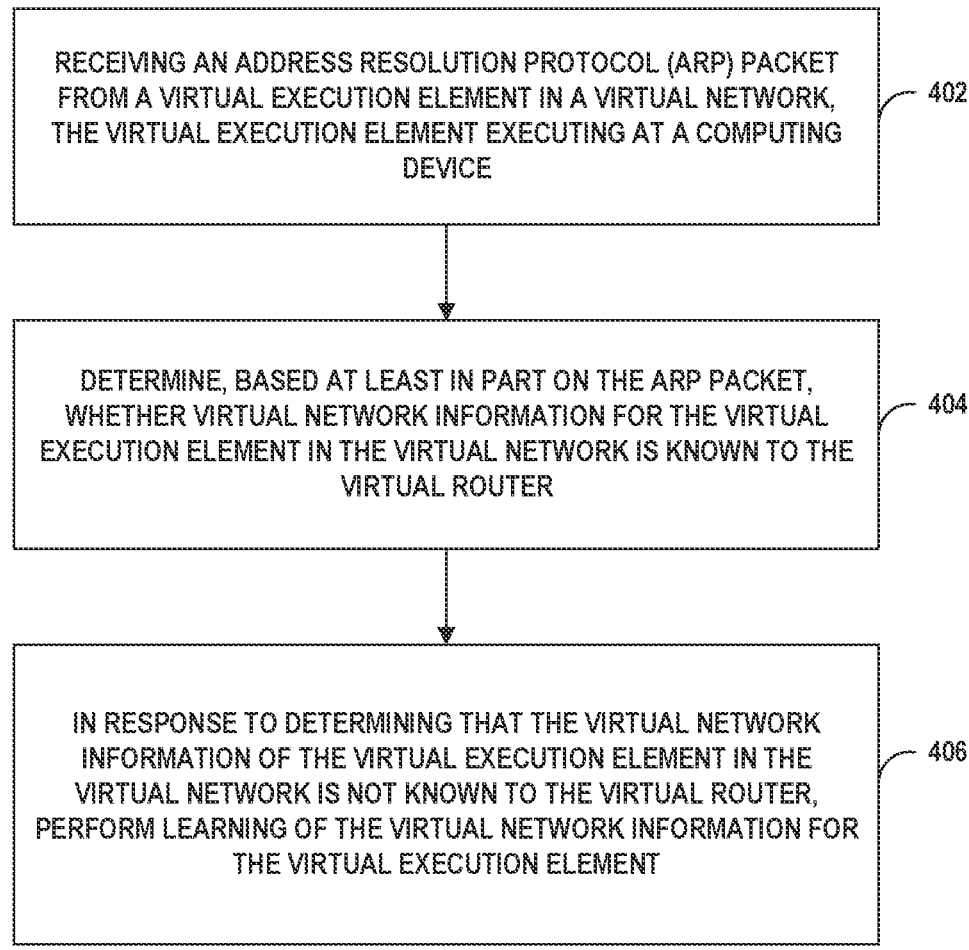
FIG. 4 is a flow diagram illustrating an example process for learning virtual network addresses of pods, according to techniques described in this disclosure.

FIG. 4 is a flow diagram illustrating an example process for learning virtual network addresses of pods, according to techniques described in this disclosure. For purposes of example, the operations are described with respect to components of computing device 200.

As shown in FIG. 4, a virtual router 220 at a computing device 200 in a virtualized computing infrastructure may receive an Address Resolution Protocol (ARP) packet from a virtual execution element (e.g., pod 202A) in a network, the virtual execution element executing at the computing device 200 (402). In some examples, the virtual execution element comprises a Kubernetes pod executed by a virtual machine 25A.

Computing device 200 may determine, based at least in part on the ARP packet, whether virtual network information for the virtual execution element in a virtual network is known to the virtual router 220 (404). In some examples, the virtual network information for the virtual execution element comprises a virtual Internet Protocol (IP) address for the virtual execution element and a Media Access Control (MAC) address for the virtual execution element. In some examples, to determine whether the virtual network information for the virtual execution element in the virtual network is known to the virtual router 220, the virtual router 220 may determine whether the virtual network information for the virtual execution element in the virtual network is stored in one or more tables 227 of the virtual router 220 for the virtual network, and may, in response to determining that the virtual network information for the virtual execution element in the virtual network is not stored in the one or more tables 227 of the virtual router for the virtual network, determine that the virtual network information for the virtual execution element in the virtual network is not known to the virtual router 220.

Virtual router 220 may, in response to determining that the virtual network information of the virtual execution element in the virtual network is not known to the virtual router 220, perform learning of the virtual network information for the virtual execution element (406). To perform the learning of the virtual network information for the virtual execution element, a virtual router agent 216 executing at the computing device 200 may generate one or more routes for the virtual network information for the virtual execution element and may advertise the one or more routes to a network controller 24 for the virtualized computing infrastructure 8. In some examples, the virtual router agent 216 may store an association of the virtual IP address for the virtual execution element and the MAC address for the virtual execution element in one or more tables of the virtual router network.

In some examples, the virtual router 220 may further receive a second ARP packet from a second virtual execution element (e.g., pod 202B) executing at the computing device 200. The virtual router 220 may determine, based at least in part on the second ARP packet, the virtual IP address for the second virtual execution element in the virtual network and the MAC address for the second virtual execution element in the virtual network. The virtual router 220 may further, in response to determining that the virtual IP address for the second virtual execution element matches the virtual IP address for the virtual execution element and that the MAC address for the second virtual execution element does not match the MAC address for the virtual execution element, determine that the virtual execution element has been deleted.

In some examples, the virtual router 220 may further receive, from the network controller 24 for the virtualized computing infrastructure 8, a request to add a route associated with a second virtual IP address and a second MAC address in the virtual network. The virtual router 200 may, in response to determining that the second virtual IP address matches the virtual IP address for the virtual execution element and that the second MAC address does not match the MAC address for the virtual execution element, determine that the virtual execution element has been deleted.

In some examples, the virtual router 220 may periodically send ARP requests to the virtual IP address for the virtual execution element and the MAC address for the virtual execution element. The virtual router 220 may, in response to not receiving ARP replies to a specified number of consecutive ARP requests sent to the virtual IP address for the virtual execution element and the MAC address for the virtual execution element, determine that the virtual execution element is unreachable.

In some examples, the virtual router 220 may establish a bidirectional forwarding and detection (BFD) session with the virtual execution element. The virtual router 220 may determine, based on the BFD session, that the virtual execution element is unreachable.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   receiving, by a virtual router at a computing device in a virtualized computing infrastructure, an Address Resolution Protocol (ARP) packet from a virtual execution element in a virtual network, the virtual execution element executing at the computing device;
   determining, by the computing device and based at least in part on the ARP packet, whether a virtual network information for the virtual execution element in the virtual network is known to the virtual router, including determining, by the virtual router, whether the virtual network information for the virtual execution element in the virtual network is stored in one or more tables of the virtual router for the virtual network, and in response to determining that the virtual network information for the virtual execution element in the virtual network is not stored in the one or more tables of the virtual router for the virtual network, determining, by the virtual router, that the virtual network information for the virtual execution element in the virtual network is not known to the virtual router; and
   in response to determining that the virtual network information of the virtual execution element in the virtual network is not known to the virtual router, performing learning, by the virtual router at the computing device, of the virtual network information for the virtual execution element.

2. The method of claim 1, further comprising:
   establishing, by a virtual router agent at the computing device, a bidirectional forwarding and detection (BFD) session with the virtual execution element; and
   determining, by the computing device and based on the BFD session, that the virtual execution element is unreachable.

3. The method of claim 1, wherein the virtual execution element comprises a Kubernetes pod executed by a virtual machine.

4. The method of claim 1, wherein the virtual network information for the virtual execution element comprises a virtual Internet Protocol (IP) address for the virtual execution element and a Media Access Control (MAC) address for the virtual execution element.

5. The method of claim 4, further comprising:
storing, by the computing device, an association of the virtual IP address for the virtual execution element and the MAC address for the virtual execution element in one or more tables of the virtual router for the virtual network.

6. The method of claim 4, further comprising:
receiving, by the virtual router at the computing device a second ARP packet from a second virtual execution element executing at the computing device;
determining, by the computing device and based at least in part on the second ARP packet, the virtual IP address for the second virtual execution element in the virtual network and the MAC address for the second virtual execution element in the virtual network; and
in response to determining that the virtual IP address for the second virtual execution element matches the virtual IP address for the virtual execution element and that the MAC address for the second virtual execution element does not match the MAC address for the virtual execution element, determining that the virtual execution element has been deleted.

7. The method of claim 4, further comprising:
receiving, by the computing device from a network controller for the virtualized computing infrastructure, a request to add a route associated with a second virtual IP address and a second MAC address in the virtual network; and
in response to determining that the second virtual IP address matches the virtual IP address for the virtual execution element and that the second MAC address does not match the MAC address for the virtual execution element, determining that the virtual execution element has been deleted.

8. The method of claim 4, further comprising:
periodically sending, by a virtual router agent at the computing device, ARP requests to the virtual IP address for the virtual execution element and the MAC address for the virtual execution element; and
in response to not receiving ARP replies to a specified number of consecutive ARP requests sent to the virtual IP address for the virtual execution element and the MAC address for the virtual execution element, determining, by the computing device, that the virtual execution element is unreachable.

9. A method comprising:
receiving, by a virtual router at a computing device in a virtualized computing infrastructure, an Address Resolution Protocol (ARP) packet from a virtual execution element in a virtual network, the virtual execution element executing at the computing device;
determining, by the computing device and based at least in part on the ARP packet, whether a virtual network information for the virtual execution element in the virtual network is known to the virtual router; and
in response to determining that the virtual network information of the virtual execution element in the virtual network is not known to the virtual router, performing learning, by the virtual router at the computing device, of the virtual network information for the virtual execution element, including generating one or more routes for the virtual network information for the virtual execution element and advertising the one or more routes to a network controller for the virtualized computing infrastructure.

10. A computing device in a virtualized computing infrastructure, comprising:
processing circuitry coupled to a memory device;
a virtual router configured for execution by the processing circuitry to:
receiving an Address Resolution Protocol (ARP) packet from a virtual execution element in a virtual network, the virtual execution element executing at the computing device; and
determine, based at least in part on the ARP packet, whether a virtual network information for the virtual execution element in the virtual network is known to the virtual router; and
a virtual router agent configured for execution by the processing circuitry to:
in response to determining that the virtual network information of the virtual execution element in the virtual network is not known to the virtual router, perform learning of the virtual network information for the virtual execution element, including generating one or more routes for the virtual network information for the virtual execution element and advertising the one or more routes to a network controller for the virtualized computing infrastructure.

11. A computing device in a virtualized computing infrastructure, comprising:
processing circuitry coupled to a memory device;
a virtual router configured for execution by the processing circuitry to:
receiving an Address Resolution Protocol (ARP) packet from a virtual execution element in a virtual network, the virtual execution element executing at the computing device; and
determine, based at least in part on the ARP packet, whether a virtual network information for the virtual execution element in the virtual network is known to the virtual router, including determining whether the virtual network information for the virtual execution element in the virtual network is stored in one or more tables of the virtual router for the virtual network, and in response to determining that the virtual network information for the virtual execution element in the virtual network is not stored in the one or more tables of the virtual router for the virtual network, determining that the virtual network information for the virtual execution element in the virtual network is not known to the virtual router; and
a virtual router agent configured for execution by the processing circuitry to:
in response to determining that the virtual network information of the virtual execution element in the virtual network is not known to the virtual router, perform learning of the virtual network information for the virtual execution element.

12. The computing device of claim 11, wherein the virtual router agent is further configured for execution by the processing circuitry to:
periodically send ARP requests to the virtual IP address for the virtual execution element and the MAC address for the virtual execution element; and
in response to not receiving ARP replies to a specified number of consecutive ARP requests sent to the virtual IP address for the virtual execution element and the MAC address for the virtual execution element, determine that the virtual execution element is unreachable.

13. The computing device of claim 11, wherein the virtual router agent is further configured for execution by the processing circuitry to:
 establish a bidirectional forwarding and detection (BFD) session with the virtual execution element; and
 determine, based on the BFD session, that the virtual execution element is unreachable.

14. The computing device of claim 11, wherein the virtual network information for the virtual execution element comprises a virtual Internet Protocol (IP) address for the virtual execution element and a Media Access Control (MAC) address for the virtual execution element.

15. The computing device of claim 14, wherein the virtual router agent is further configured for execution by the processing circuitry to:
 store an association of the virtual IP address for the virtual execution element and the MAC address for the virtual execution element in one or more tables of the virtual router.

16. The computing device of claim 14, wherein the virtual router is further configured for execution by the processing circuitry to:
 receive a second ARP packet from a second virtual execution element executing at the computing device;
 determine, based at least in part on the second ARP packet, the virtual IP address for the second virtual execution element in the virtual network and the MAC address for the second virtual execution element in the virtual network; and
 in response to determining that the virtual IP address for the second virtual execution element matches the virtual IP address for the virtual execution element and that the MAC address for the second virtual execution element does not match the MAC address for the virtual execution element, determine that the virtual execution element has been deleted.

17. The computing device of claim 14, wherein the virtual router is further configured for execution by the processing circuitry to:
 receive, from a network controller for the virtualized computing infrastructure, a request to add a route associated with a second virtual IP address and a second MAC address in the virtual network; and
 in response to determining that the second virtual IP address matches the virtual IP address for the virtual execution element and that the second MAC address does not match the MAC address for the virtual execution element, determine that the virtual execution element has been deleted.

18. A non-transitory computer-readable medium comprising instructions for causing a programmable processor of a computing device in a virtualized computing infrastructure to:
 receive, by a virtual router executing at the computing device, an Address Resolution Protocol (ARP) packet from a virtual execution element in a virtual network, the virtual execution element executing at the computing device;
 determine, based at least in part on the ARP packet, whether a virtual network information for the virtual execution element in the virtual network is known to the virtual router, including determining whether the virtual network information for the virtual execution element in the virtual network is stored in one or more tables of the virtual router for the virtual network, and in response to determining that the virtual network information for the virtual execution element in the virtual network is not stored in the one or more tables of the virtual router for the virtual network, determining that the virtual network information for the virtual execution element in the virtual network is not known to the virtual router; and
 in response to determining that the virtual network information of the virtual execution element in the virtual network is not known to the virtual router, perform learning of the virtual network information for the virtual execution element.

\* \* \* \* \*